(12) United States Patent
Li et al.

(10) Patent No.: US 7,674,719 B2
(45) Date of Patent: Mar. 9, 2010

(54) VIA HOLE MACHINING FOR MICROWAVE MONOLITHIC INTEGRATED CIRCUITS

(75) Inventors: Ming Li, Chelmsford, MA (US); Xinbing Liu, Cambridge, MA (US); Hiroyuki Sakai, Osaka (JP); Masaaki Nishijima, Osaka (JP); Daisuke Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 1255 days.

(21) Appl. No.: 11/194,419

(22) Filed: Aug. 1, 2005

(65) Prior Publication Data

US 2007/0026676 A1 Feb. 1, 2007

(51) Int. Cl.
*H01L 21/302* (2006.01)
(52) U.S. Cl. .................. 438/708; 438/700; 219/121.71
(58) Field of Classification Search .................. 438/700, 438/708, 719, 723, 724; 219/121.69, 121.71
See application file for complete search history.

(56) References Cited

U.S. PATENT DOCUMENTS

| | | | |
|---|---|---|---|
| 4,473,737 A | | 9/1984 | Thomas |
| 2002/0074320 A1* | | 6/2002 | Liu et al. ............... 219/121.71 |
| 2003/0103107 A1 | | 6/2003 | Cheng |
| 2003/0235385 A1* | | 12/2003 | Taylor et al. ................. 385/129 |
| 2005/0025445 A1 | | 2/2005 | Schoroeder et al. |
| 2005/0226287 A1* | | 10/2005 | Shah et al. ..................... 372/25 |
| 2006/0040471 A1* | | 2/2006 | Ramanathan et al. ....... 438/459 |
| 2006/0091125 A1* | | 5/2006 | Li et al. .................. 219/121.69 |
| 2006/0169677 A1* | | 8/2006 | Deshi ...................... 219/121.7 |

OTHER PUBLICATIONS

PCT International Search Report for International Application No. PCT/US2006/029919; Mailed Mar. 26, 2007.

* cited by examiner

*Primary Examiner*—Kin-Chan Chen
(74) *Attorney, Agent, or Firm*—RatnerPrestia (57) ABSTRACT

A method for forming a via in a sapphire substrate with a laser machining system that includes an ultrafast pulsed laser source. The sapphire substrate is provided. Pulses of laser light are substantially focused to a beam spot on the first surface of the sapphire substrate such that each focused pulse of laser light ablates a volume of the sapphire substrate having a depth less than the substrate thickness. The beam spot of the focused laser light pulses is scanned over a via portion of the first surface of the sapphire substrate. The sapphire substrate is moved in a direction substantially normal to the first surface to control the volume of the sapphire substrate ablated by each pulse of laser light to be substantially constant. The pulsing and scanning steps are repeated until the via is formed extending from the first surface to the second surface of the sapphire substrate.

29 Claims, 7 Drawing Sheets

VIA HOLE MACHINING FOR MICROWAVE MONOLITHIC INTEGRATED CIRCUITS

TECHNICAL FIELD

The present invention relates generally to machining via holes in sapphire and, more particularly, to ultrafast laser machining of via holes in a sapphire substrate.

BACKGROUND OF THE INVENTION

In the field of high frequency electronic circuit design, gallium arsenide (GaAs) microwave monolithic integrated circuits (MMIC's) were demonstrated in the 1970's. Since then, many resources have been put into extending the maximum operating frequency ($f_{max}$) of GaAs products (e.g., MESFET, PHEMT, HEMT, and HBT technologies) into the hundreds of gigahertz (GHz). However, due to its superior material properties, Gallium nitride (GaN) may provide a superior alternative GaAs. GaN may offer, for example, higher efficiency and a higher operating voltage with lower current, thereby allowing the design of circuitry with approximately ten times the power density of a GaAs PHEMT.

The choice of substrates on which to grow GaN-based MMIC's is an important factor in device performance. It may be desirable, for example, to provide a substrate with low electrical conductivity to limit RF losses through the substrate to ground (i.e., a non-insulating substrate is equivalent to a lossy transmission line to ground at high frequencies). Accordingly, materials such as sapphire or SiC may be used as substrates for GaN devices. Sapphire is a particularly attractive candidate for substrate material due to its cost effectiveness and low-loss characteristics.

However, MMIC's desirably incorporate via holes through the substrate to provide adequate ground contacts to a backside metallization formed thereon. Additionally, such vias may desirably provide thermal contact to assist in heat dissipation from the MMIC to the package. For a 100 µm thick sapphire substrate, for example, 8 to 10 via holes having diameters between 30 and 60 µm may be desired per 1 mm² chip. This adds up to approximately 60,000 vias for a standard 4 inch wafer, and approximately 150,000 vias for a standard 6 inch wafer. Due to sapphire's materials characteristics, however, it may be cost prohibitive, inefficient, and generally undesirable to mechanically machine 60,000 to 150,000 via holes approximately 100 µm or deeper into sapphire substrates using standard machining techniques.

It may also be cost prohibitive and undesirable to machine this many via holes into sapphire using a dry etch or ion beam milling. Dry etch or ion beam milling techniques require a mask to be placed over the sapphire with holes in the mask at the desirable via hole locations. The mask, however, may be undesirably thick and generally impractical for forming a large number of via holes at a desired spacing on a tough sapphire substrate.

SUMMARY OF THE INVENTION

The present invention is embodied in an exemplary method for forming a via in a sapphire substrate with a laser machining system that includes an ultrafast pulsed laser source. The sapphire substrate has first surface and a second surface separated by a substrate thickness. Pulses of laser light of the ultrafast pulsed laser source are substantially focused to a beam spot on the first surface of the sapphire substrate such that each focused pulse of laser light ablates a volume of the sapphire substrate having a depth less than the substrate thickness of the sapphire substrate. The beam spot of the focused pulses of laser light is scanned over a via portion of the first surface of the sapphire substrate. The sapphire substrate is moved in a direction substantially normal to the first surface of the sapphire substrate to control the volume of the sapphire substrate ablated by each pulse of laser light to be substantially constant. The pulsing and scanning steps are repeated until the via is formed extending from the first surface of the sapphire substrate to the second surface of the sapphire substrate.

In a further embodiment, the exemplary method includes blowing a fluid or aerosol stream across at least the via portion of the first surface of the sapphire substrate to redirect debris from the via portion. In another exemplary embodiment, an imaging system is used to obtain imaging data of at least the via portion of the first surface of the sapphire substrate, and a controller controls the ablation method according to the imaging data.

An alternate exemplary embodiment of the invention is a method for forming a semiconductor device on a substrate having a via. The substrate, including an electrically insulating material having a first surface and a second surface, is provided. An ablation buffer layer is formed on the second surface of the substrate and a semiconductor layer is formed on the ablation buffer layer. Pulses of laser light of an ultrafast pulsed laser source are substantially focused to a beam spot on the first surface of the substrate such that each focused pulse of laser light ablates a volume of the substrate. The beam spot of the focused pulses of laser light is scanned over a via portion of the first surface of the substrate until the via is formed extending from the first surface of the substrate to the ablation buffer layer, thereby exposing a portion of the ablation buffer layer. The exposed portion of the ablation buffer layer is etched to expose a contact portion of the semiconductor layer. An electrode is formed on the first surface of the substrate such that the electrode is electrically coupled through the via to the contact portion of the semiconductor layer.

Another exemplary embodiment of the invention is a sapphire substrate including a first surface, a second surface, a via extending from the first surface to the second surface, and a reduced heat affected zone disposed around the via. The reduced heat affected zone has a depth less than about 100 nm. The heat affect zone exhibits substantially no chemical damage.

Yet another exemplary embodiment of the invention is a microwave monolithic integrated circuit including: a substrate having a via extending from a first surface to a second surface; a semiconductor layer coupled to the second surface of the substrate; and an electrode formed on the first surface of the substrate. The semiconductor layer includes a plurality of microwave circuit elements. The electrode is electrically coupled to the semiconductor layer through the via.

An additional exemplary embodiment of the invention is a method for forming a semiconductor device on a substrate. The substrate, includes an electrically insulating material having a first surface and a second surface. A semiconductor layer is formed on the first surface of the substrate. An ablation window is etched into the semiconductor layer, thereby exposing a via portion of the substrate. Pulses of laser light from an ultrafast pulsed laser source are substantially focused to a beam spot on the exposed via portion of the substrate such that each focused pulse of laser light ablates a volume of the substrate. The beam spot of the focused pulses of laser light is scanned over the via portion of the first surface of the substrate until the via is substantially formed extending from the first surface of the substrate to within a predetermined distance from the second surface of the substrate. An electrode structure is then formed on at least the via portion of the substrate.

In a still further exemplary embodiment of the present invention, the second surface of the substrate may be thinned to expose the electrode.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Ultrafast lasers (i.e., those emitting pulses with pulse lengths shorter than about 1 nanosecond, such as femtosecond and picosecond pulses) may be used to machine various solid state materials with high precision. Such machining additionally produces relatively small heat affected zones. Ultrafast laser machining may be used on a wide variety of materials, including materials that may be difficult the machine using other techniques. More specifically, ultrafast lasers may be used to machine via holes in substrates suitable for use with GaN devices (e.g., sapphire, silicon carbide, etc.) to desirable depths, where the via side walls exhibit a surface quality comparable to bare substrate material due to the reduced heat affected zone.

Figure 1:
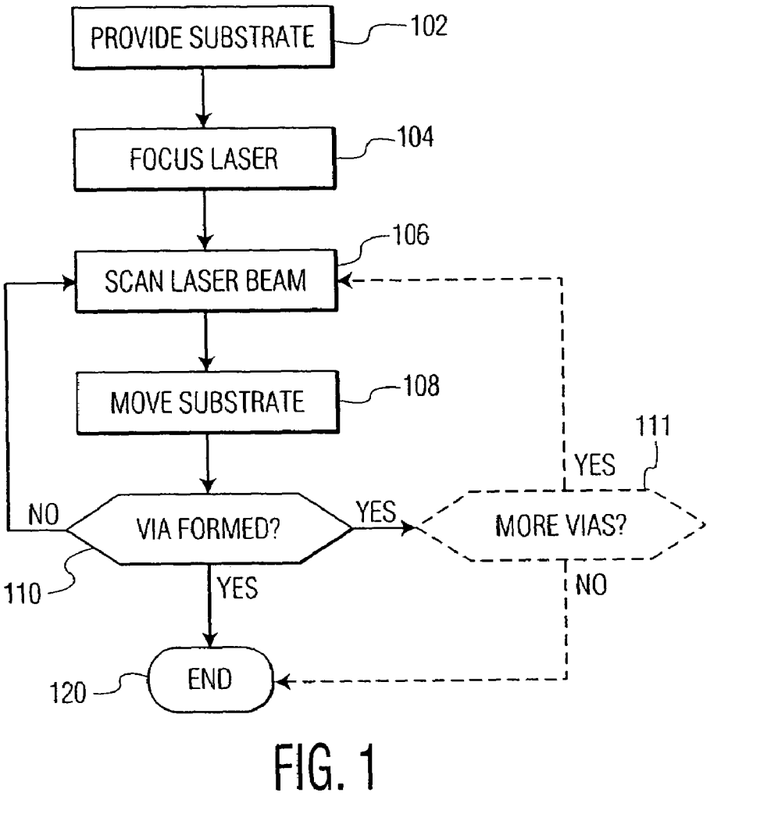
FIG. 1 is a flow chart illustrating an exemplary process for machining a substrate via, according to the present invention.

Referring now to the drawing, in which like reference numbers refer to like elements throughout the various figures that include the drawing, FIG. 1 is a flow chart illustrating an exemplary method of ablating a via in a mechanically and chemically tough substrate with an ultrafast pulsed laser source, according to one exemplary embodiment of the present invention. The substrate is provided step 102. The substrate is formed of a material that is mechanically and chemically resistant, such as sapphire or silicon carbide, and includes some thickness of the material separating a first surface from a second surface. While described with regard to a sapphire or silicon carbide substrate, it is contemplated that the method may also be used to form vias in other mechanically and chemically resistant materials. Such materials may be developed as substrates for GaN microwave monolithic semiconductor devices or other semiconductor devices.

The ultrafast laser is desirably focused, step 104. This focusing may include substantially focusing pulses of laser light from the ultrafast laser source to a beam spot incident on a surface of the substrate (such as the first surface, for example). Each pulse of laser light is desirably focused such that it ablates a predetermined volume of the substrate material. It may be desirable that the ablated volume have a depth less than the thickness of the substrate so that any device layers on the other side of the substrate are not affected by the ablation of the substrate. Also, typically the substrate may be 100 µm or more thick and it is desirable, for process control, for the depth ablated by each pulse to be significantly less than 100 µm, typically less than 1 µm.

Figure 2A:
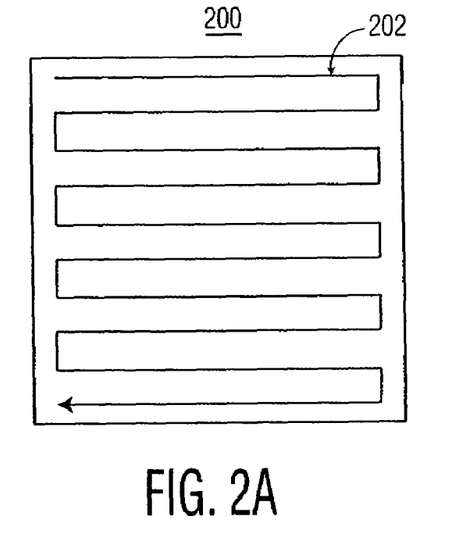
FIG. 2A is a top view of an exemplary laser beam scan path for machining a rectangular via, according to the present invention.
Figure 2B:
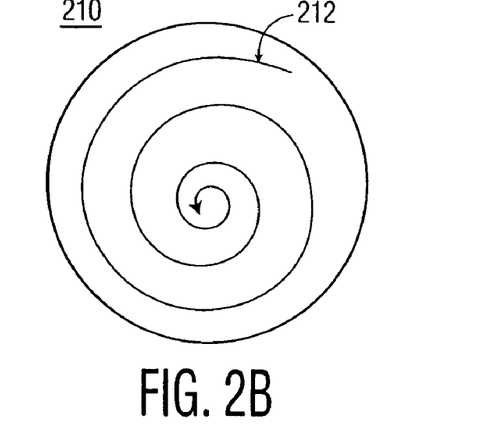
FIG. 2B is a top view of an exemplary laser beam scan path for machining a round via, according to the present invention.

The laser beam is scanned, according to a predetermined scan pattern, across a via portion on the surface of the substrate, step 106. The via portion is the area(s) on the surface of the substrate being machined where a via is (or vias are) to be formed extending through the substrate and to the opposite surface. The predetermined scan pattern is selected according to a desired via shape. For example, FIG. 2A illustrates raster scan pattern 202, which may be chosen if rectangular via 200 is desired. Alternatively, as shown in FIG. 2B, spiral trepanning scan pattern 212 may be chosen, if round via 210 is desired. Those skilled in the art may recognize that a plurality of scan patterns may be generated or obtained for use in the method, without departing from the scope of the present invention.

The substrate is moved in a direction normal to the surface being ablated (such as the first surface, for example), step 108, to control the volume of the substrate that is ablated by each pulse of ultrafast laser light. Since each pulse of laser light ablates a portion of the substrate by some depth, the next pulse of laser light over that portion travels a greater distance to reach the surface of the substrate (i.e., the previous focal distance plus the depth of ablation from the previous laser pulse) and may exhibit a different size beam spot on the ablated surface, depending on whether the beam is converging or diverging. Accordingly, a different volume of substrate material may be ablated as a result of this likely change in beam spot size, and the corresponding change in beam fluence. Therefore, to maintain the ablation volume/depth at a substantially constant amount, the material surface of the portions being ablated (i.e., the via portion) is desirably kept at approximately the same focal plane of the laser light by moving the substrate, as described above. In an alternate exemplary embodiment, the substrate may also be tilted, rotated, and/or moved in a radial direction coplanar to the surface being ablated. Such movements in tilt angle, rotational angle, and radial direction may be performed to help maintain the ablation volume/depth at a substantially constant amount, as described above, or as part of a scan pattern, as described step 106. For example, a spiral scan for forming a round via may include rotating the substrate while moving it radially in a direction coplanar to the surface. Those skilled in the art may recognize that various movement algorithms may be implemented including various movement schemes (e.g., rotational speed, radial direction, tilt direction, movement speed, number of points of ablation along a scan path, etc.) without departing from the scope of the present invention.

In another embodiment of the invention, the substrate may be held stationary while the laser beam is scanned across its surface and the focal plane adjusted to control the volume of the substrate that is ablated by each pulse of ultrafast laser light, as described above. Accordingly, the scanning of the laser beam may be controlled by movement of an optical lens in the optical path of the laser beam, thereby affecting the location of the focal plane on the substrate; a scan mirror may also be used to control the optical path of the laser beam, thereby affecting the location of the beam spot on the substrate. Those skilled in the art will recognize that many other means may be employed to affect the path and focus of the laser beam so as to provide a scanning of the laser beam upon the substrate surface, without departing from the scope of the present invention. In yet another embodiment, both substrate movement in a direction normal to the surface being ablated and the focal plane of the laser light may be adjusted, as described above, during the ablation process.

It is determined whether the via is formed, step 110. Forming the via may involve ablating the substrate until the via extends from one surface of the substrate to the other (i.e., from the first surface to the second surface). In another exemplary embodiment of the invention, the via may extend only to a predetermined depth within the substrate. If the via is determined to not yet be formed, the process continues to scan the laser beam, step 106, and move the substrate, step 108, as described above, until the via is formed. Once it is determined in step 110 that the via is formed, the process is complete, step 120.

Alternately, if multiple vias are to be machined in series, the process may proceed to step 111 (shown in phantom) instead of step 120. It is determined whether any further vias remain to be machined, step 120. If further vias remain the ablation process for the next of these remaining vias is initiated, step 106. Once all of the desired vias are formed, the process is complete, step 120. In an exemplary embodiment where the vias formed in step 108 extend to a predetermined depth within the substrate and not through the substrate, the substrate may be wafer thinned prior to step 120 in order to fully form via holes.

During the ablation process, the ejection of substrate material may generate undesirable debris that may be redeposited on the surface of the substrate. It is often very difficult to remove the debris due to the strong intermolecular forces that bond the debris to the surface of the substrate. In an exemplary embodiment of the invention, therefore, a fluid or aerosol stream may be blown across the via portion of the substrate to redirect ablation debris away from the via portion. This keeps ablation debris from being redeposited back in the via that is being formed. The direction of the stream may be chosen to direct ablation debris to a predetermined deposit location where they may be safely deposited. Additionally, it may be desirable for the stream to be strong enough to substantially inhibit redeposition anywhere on the substrate or any semiconductor layers that may have been grown on the substrate. The stream may consist of an aerosol, an assist gas, an inert gas, or air. The aerosol that may include solid particles, such as dry ice, or liquid particles, such as an alcohol.

It is also generally undesirable for ablation debris to be redeposited on the substrate surface, the semiconductor device layer, or, generally, any surface of a device being formed according to the present invention. Accordingly, in another exemplary embodiment of the invention, a surface protection layer may be formed on the surface of the substrate. Specifically, the protection layer may be formed on the surface that is being ablated (such as the first surface, for example). Ablation debris generated by the ablation process, therefore, may redeposit on the surface protection layer without becoming bonded to the substrate surface. In a further exemplary embodiment, by blowing a stream over the via portion, ablation debris is directed away from the via (which includes exposed substrate material) and onto the surface protection layer. The surface protection layer may be formed from an easily removable material, such as polyvinyl alcohol (PVA) or another polymer, for example. If a surface protection layer is implemented, it may be desirable to ablate the portion of the surface protection layer formed over the via portion. Alternately, the portion of the surface protection layer over the via portion may be removed before ablation, creating a window over the via portion. After the ablation process is completed, the rest of the surface protection layer may be removed, whereby the ablation debris may be removed along with the protection layer.

To monitor the ablation process, an imaging system may desirably be used to obtain imaging data of the substrate during the ablation process. The imaging data may then be used to monitor the progress of the ablation to determine whether the via is formed, whether the via is being formed according to plan, and/or whether ablation debris is being redeposited in an undesirable location on the surface of the substrate. By analyzing the imaging data, a controller may then be used to control the movement of the substrate, the scanning of the beam spot, and any other process settings (e.g., laser pulse rate, adjustments to the via shape, etc.).

Figure 3:
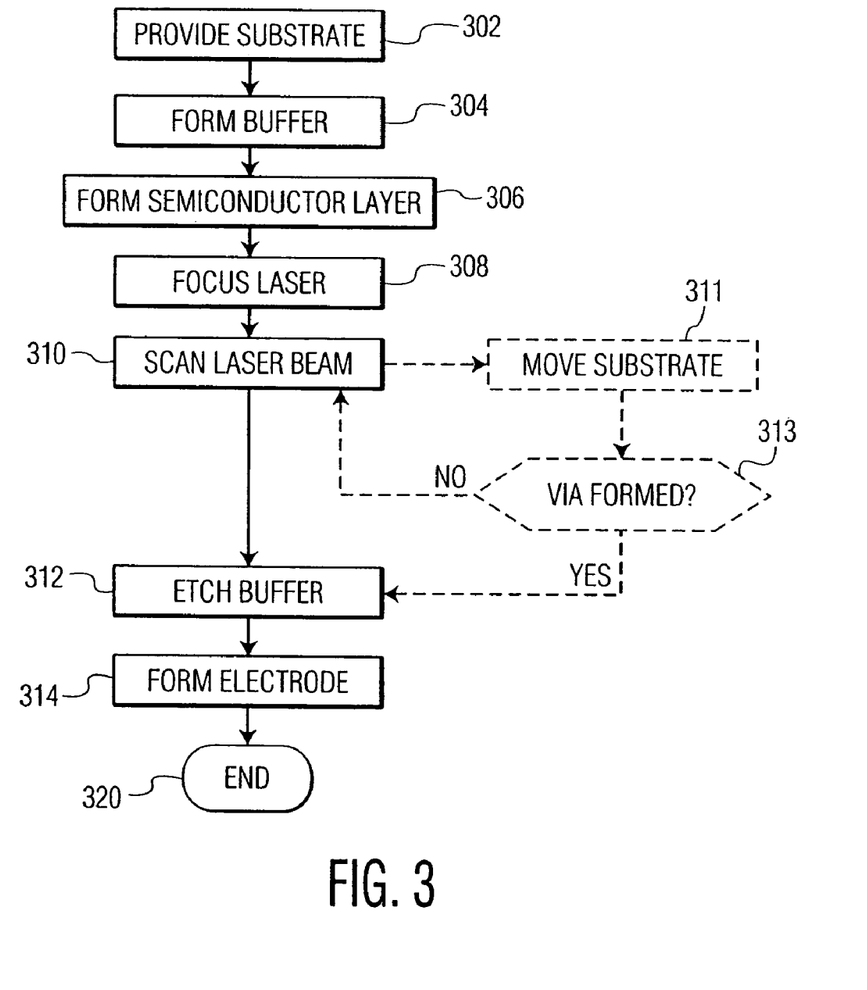
FIG. 3 is a flow chart illustrating an exemplary process for forming a microwave monolithic integrated circuit, according to the present invention.

FIG. 3 is a flow chart illustrating an exemplary method for forming a semiconductor device on a substrate having a via, according to another exemplary embodiment of the present invention. The substrate is provided, step 302. The substrate is desirably formed of an electrically insulating material, such as sapphire or silicon carbide, for example, and includes a first surface and a second surface. While described with regard to a sapphire or silicon carbide substrate, it is contemplated that the method may also be used with other mechanically and chemically resistance substrates. GaN microwave monolithic semiconductor devices are one example of a semiconductor device that may be formed on the substrate by the exemplary method.

This exemplary embodiment of the present invention includes steps to machine a via on the first surface of the substrate through to the second surface of the substrate by ablating substrate material with ultrafast laser light. Accordingly, it may be desirable to control the ablation so that the laser light does not burst through the second surface and undesirably ablate portions of the semiconductor device layer disposed on the second surface. Various circuit components, such as resistors, capacitors, inductors, transistors, and the like, may be formed in the semiconductor layer, and ablation of semiconductor material near these components may have undesirable effects on circuit performance. To prevent undesirable ablation of semiconductor material, therefore, an ablation buffer layer may be selectively formed on the second surface of the substrate, step 304. The ablation buffer layer is selectively formed in sections that extend only over via hole portions of the second surface of the substrate. These ablation buffer layer sections are formed from a material that is resistant to ablation by the ultrafast laser light. Such materials may desirably have a high ablation threshold due to reduced energy absorption from the ultrafast laser pulses or due to strong bonds within the material. For example, the ablation buffer layer may be formed of silicon dioxide ($SiO_2$) or amorphous diamond.

A semiconductor layer is formed over the exposed portions of the second surface of the substrate and the ablation buffer layer sections, step 306. The semiconductor layer may for formed of any semiconductor material. The semiconductor layer may include a number of sublayers and may also include one or more circuit elements, such as resistors, capacitors, inductors, and transistors, for example, formed in the semiconductor layer. In one exemplary embodiment of the present invention, the semiconductor layer may be gallium nitride (GaN) and the circuit elements may form a microwave monolithic integrated circuit (MMIC).

The ultrafast laser is focused on the first surface of the substrate, step 308. This may include substantially focusing pulses of laser light from an ultrafast laser source to a beam spot having a desired size on the first surface of the substrate such that each pulse of laser light ablates approximately a given volume of the substrate. The laser beam is scanned, according to a predetermined scan pattern, across a via portion of the first surface of the substrate, step 310. The via portion is the area of the first surface of the substrate where the via is (or vias are) to be formed, extending through the substrate and to the second surface. The pulsing and scanning is repeated until the via extends through the substrate to expose a portion of the ablation buffer layer. The predetermined scan pattern may be selected according to a desired via shape. For example, FIG. 2A illustrates raster scan pattern 202, which may be desired if rectangular via 200 is to be formed, or, as shown in FIG. 2B, spiral trepanning scan pattern 212 may be desired if round via 210 is to be formed. Those skilled in the art may recognize that a plurality of scan patterns may be generated or obtained for use in the method, without departing from the scope of the present invention.

In an alternate exemplary embodiment, the substrate is moved in a direction normal to the surface being ablated (i.e., the first surface), optional step 311 (shown in phantom), to control the volume of the substrate that is ablated by each pulse of ultrafast laser light. Because each pulse of laser light ablates a portion of the substrate by some depth, the next pulse of laser light over that portion travels a greater distance to reach the surface of the substrate and may also exhibit a changed beam spot size. Accordingly, a different volume of substrate material may be ablated as a result of this difference in beam spot size. Therefore, to keep the ablation volume/depth constant, the material surface of the portions being ablated (i.e., the via portion) is desirably maintained at the same focal plane of the laser light by moving the substrate, as described above. After each movement of the substrate by a predetermined step size, it is determined whether the via is completed step 313 (shown in phantom). If not, the scanning process continues, step 310.

It is noted that it may be desirable to fix the laser movement step size at a distance less than or equal to the thickness of the ablation buffer layer. Because the ablation buffer layer may be substantially transparent to the laser beam, if the substrate is moved by a distance greater than the thickness of the ablation buffer layer, it may be possible for the laser beam to pass though the ablation buffer layer and form a beam spot on the back surface of the semiconductor device layer having a high enough fluence to undesirably machine the semiconductor layer.

In a further exemplary embodiment, the substrate may also be tilted, rotated, and/or moved in a radial direction coplanar to the surface being ablated. Such movements in tilt angle, rotational angle, and radial direction may be performed to help keep the ablation volume/depth constant, as described above, or as part of a scan pattern. For example, a spiral trepanning scan pattern for forming a round via may include rotating the substrate while moving it radially in a direction coplanar to the surface. Those skilled in the art will recognize that various movement algorithms may be implemented including various movement schemes (e.g., rotational speed, radial direction, tilt direction, movement speed, number of points of ablation along a scan path, etc.) without departing from the scope of the present invention.

In another exemplary embodiment of the invention, the substrate may be held stationary while the laser beam is scanned across its surface and the focal plane adjusted to control the volume of the substrate that is ablated by each pulse of ultrafast laser light, as described above. Accordingly, the scanning of the laser beam may be controlled by movement of an optical lens in the optical path of the laser beam, thereby affecting the location of the focal plane on the substrate; a scan mirror may also be used to control the optical path of the laser beam, thereby affecting the location of the beam spot on the substrate. Those skilled in the art will recognize that many other means may be employed to affect the path and focus of the laser beam so as to provide a scanning of the laser beam upon the substrate surface, without departing from the scope of the present invention. In yet another embodiment, both substrate movement in a direction normal to the surface being ablated and the focal plane of the laser light may be adjusted, as described above, during the ablation process.

Once the via is formed extending from one surface of the substrate to the other (i.e., from the first surface to the second surface), the portion(s) of the ablation buffer layer that have been exposed by the via(s) extending through the substrate may be etched, step 312, to expose the contact portions of the semiconductor layer. Alternately, the focusing and scanning steps may be repeated for a plurality of other vias that need to be formed, prior to etching the ablation buffer layer. Once the exposed portions of the ablation buffer layer are etched away, one or more contact portions of the semiconductor layer are thereby exposed. The contact portions may include metallization electrically coupled to any number of circuit elements disposed in the semiconductor layer. An electrode is formed on the first surface of the substrate, step 314, such that the electrode is electrically coupled, through the via, to the contact portion(s) of the semiconductor layer. In one exemplary embodiment of the present invention, this electrode may provide a ground contact. In another exemplary embodiment, the electrode may provide a power contact. In yet another exemplary embodiment, the electrode may include a heat sink thermally coupled, through the via, to the contact portions of the semiconductor layer.

In an alternate exemplary embodiment, a thermally conductive ablation buffer layer is formed in step 304 and the electrode formed in step 314 includes a heat sink. In this embodiment, the electrode/heat sink may be thermally coupled to the ablation buffer layer. Accordingly, a thermal gradient may be formed that allows heat generated by the semiconductor layer to diffuse, through the thermally conductive ablation buffer layer, to the electrode/heat sink.

The process may be monitored using an imaging system, as described above. In addition, contamination of the surface of the substrate by redeposited ablation debris may be prevented using a fluid or aerosol stream and/or a surface protection layer, as described above.

Figure 4A:
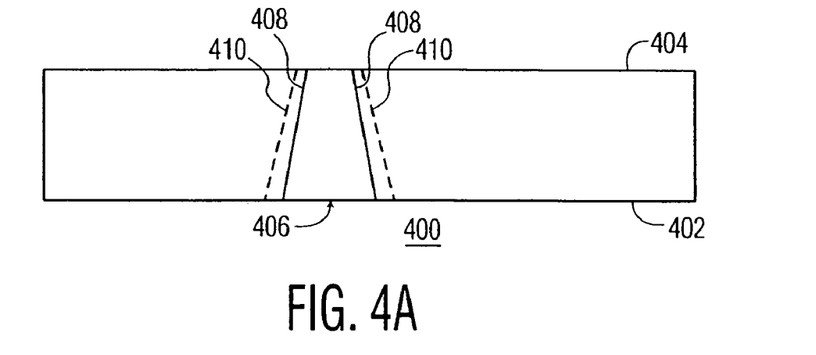
FIG. 4A is a side plan view of a substrate having a laser machined via, according to the present invention.

FIGS. 4A-D illustrate an exemplary sapphire substrate with a via machined in it according to the present invention. FIG. 4A is a side plan view of the substrate 400, which includes first surface 402, second surface 404, and ultrafast laser machined via 406 extending from first surface 402 to second surface 404. Via 406 is defined by side walls 408. Since via 406 is formed by an ultrafast laser (such as by the exemplary method of FIG. 1, for example), substrate 400 exhibits reduced heat affected zone 410 disposed around via 406. Reduced heat affected zone 410 extends from via side walls 508 to a depth less than about 100 nm into the adjacent substrate material. Reduced heat affected zone 410 may also exhibit substantially no chemical damage, because via 406 is formed by ablation using an ultrafast laser as opposed to a chemical etch, for example.

Figure 4B:
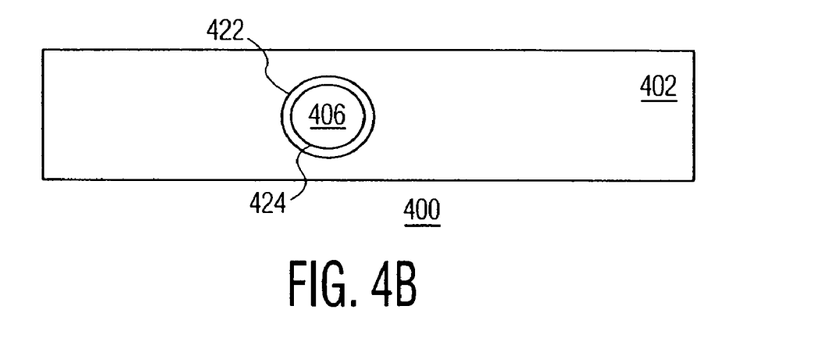
FIG. 4B is a bottom plan view of a substrate having a laser machined via, according to the present invention.
Figure 4C:
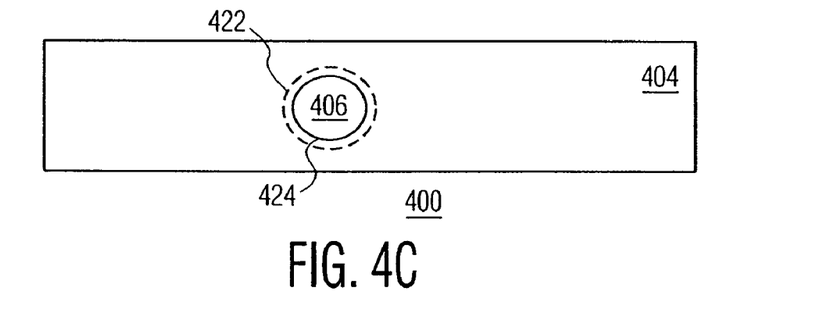
FIG. 4C is a top plan view of a substrate having a laser machined via, according to the present invention.
Figure 4D:
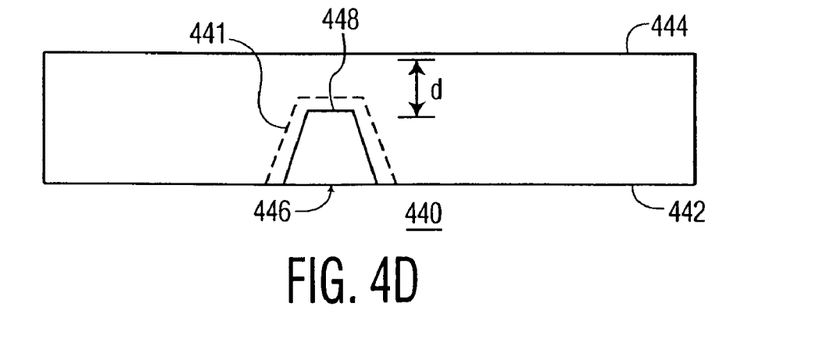
FIG. 4D is a side plan view of a substrate having a laser machined via extending to a predetermined depth, according to the present invention.

FIG. 4D is a side plan view of the substrate 440, which includes first surface 442, second surface 444, and ultrafast laser machined via 446 extending from first surface 402 to a predetermined distance d from second surface 444. Via 446 is defined by side walls 448 and is adjacent to reduced heat affected zone 441. Substrate 440 may be wafer thinned from second surface 444 by a depth equal to predetermined distance d, thereby fully forming a via hole as shown in FIG. 4A.

In one exemplary embodiment of the invention, side walls 508 may be sloped to provide greater adhesion to a metallization layer that may be disposed thereon (not shown in FIGS. 4A-C), such that the diameter (or surface area, generally) of via 406 is larger at first surface 402 than at second surface 404. FIG. 4B is an top view of first surface 402 of substrate 400. FIG. 4C is an bottom view of second surface 404 of substrate 400. In this exemplary embodiment, first surface area 422 of via 406 is greater than second surface area 424.

In an exemplary embodiment of the present invention, for example, via 406 may include circular cross sections on first and second surfaces 402 and 404. Via 406 desirably has a height greater than or equal to 100 nm, the diameter of the first surface circular cross-section may be about 50 μm, and the diameter of the second surface circular cross-section may be about 30 μm. In a further exemplary embodiment of the invention, first surface area 422 may be between about 700 μm$^2$ and about 3850 μm$^2$ (which may correspond to circular diameters of between about 30 μm and about 70 μm, respectively, for example), and second surface area 424 may be between about 75 μm$^2$ and about 2000 μm$^2$ (which may correspond to circular diameters of between about 10 μm and about 50 μm, respectively, for example). In another exemplary embodiment, via 406 has a height greater than or equal to 75 μm and first and second surface areas 422 and 424 may be between 1 μm$^2$ and 1 mm$^2$.

Figure 5A:
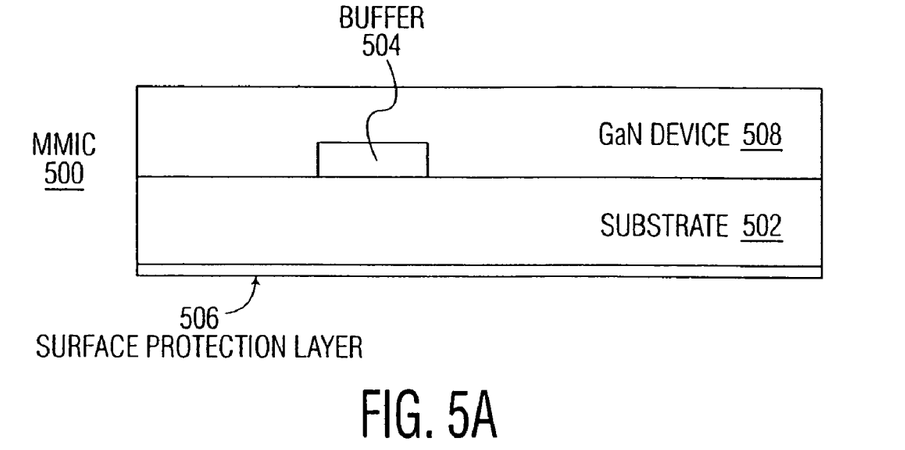
FIGS. 5A, 5B and 5C are cross-sectional side plan drawings of an apparatus according to an exemplary embodiment of the present invention during manufacture, according to a method of the present invention.
Figure 5B:
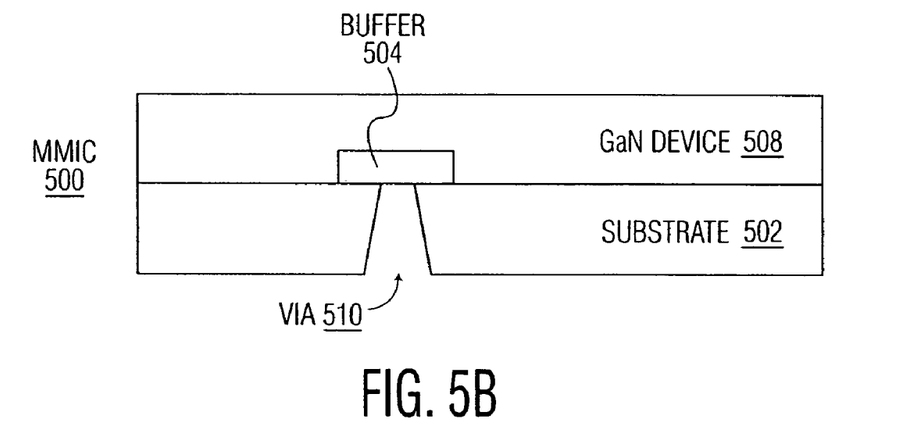
Figure 5C:
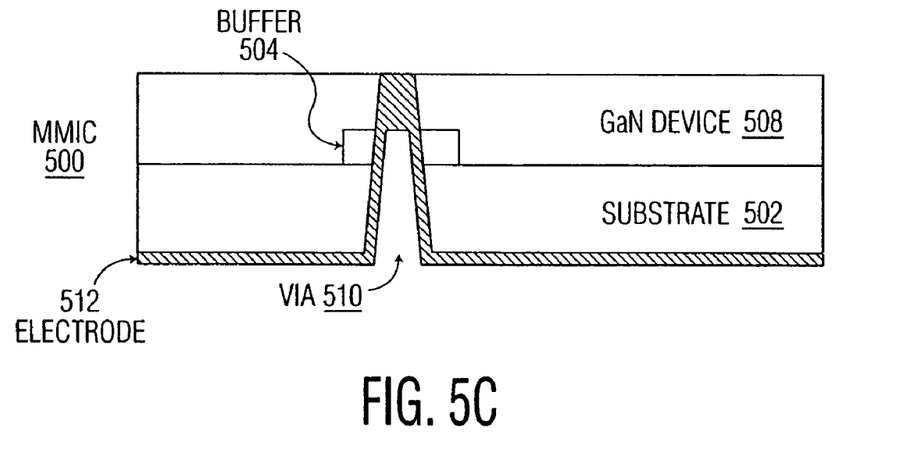

FIG. 5A-C illustrate an exemplary microwave monolithic integrated circuit (MMIC) according to the present invention, during different stages of manufacture. FIG. 5A is a cross-sectional view of MMIC 500 after ablation buffer layer section 504 has been selectively formed on a second surface of substrate 502, semiconductor layer 508 has been formed on the exposed portions of the second surface of substrate 502 and ablation buffer layer section 504, and surface protection layer 506 has been formed on a first surface of substrate 502. In an alternate exemplary embodiment of the invention, no buffer layers are formed, and semiconductor layer 508 may be formed directly on the second surface of substrate 502. In one exemplary embodiment, the semiconductor layer may by formed of one or more sublayers of gallium nitride (GaN) material and may include any number of microwave circuit elements (e.g., resistors, capacitors, inductors, transistors, transmission lines, etc.), the substrate may be sapphire or silicon carbide (SiC), and the ablation buffer layer may be formed of amorphous diamond or silicon dioxide ($SiO_2$). In another exemplary embodiment of the invention, ablation buffer layer 504 may be formed extending over the entire second surface of substrate 502.

FIG. 5B is a cross-sectional view of MMIC 500 after via 510 has been formed extending from the first surface of substrate 502 to the second surface, i.e. at the ablation buffer layer. Via 510 may extend a distance greater than or equal to 100 nm from the first surface to the second surface of substrate 502. In one exemplary embodiment of the present invention, via 510 may exhibit characteristics substantially similar to those of via 506, described above with respect to FIGS. 4A-C.

FIG. 5C is a cross-sectional view of MMIC 500 after via 510 has been extended through ablation buffer layer 504 and semiconductor layer 508 by etching these layers, for example. Surface protection layer 506 has also been removed at this stage of manufacture, and electrode 512 has been formed on the first surface of substrate 502. FIG. 5C shows via 510 and electrode 512 extending into semiconductor layer 508. It is noted that, alternatively via 510 may end at the surface of semiconductor layer 508 (not shown) and that electrode 512 may make electrical contact with a contact portion of this surface. Electrode 512 may be electrically coupled to semiconductor layer 508 through via 510. Alternately, electrode 512 may be thermally coupled to semiconductor layer 508 through via 510 as well.

Figure 8:
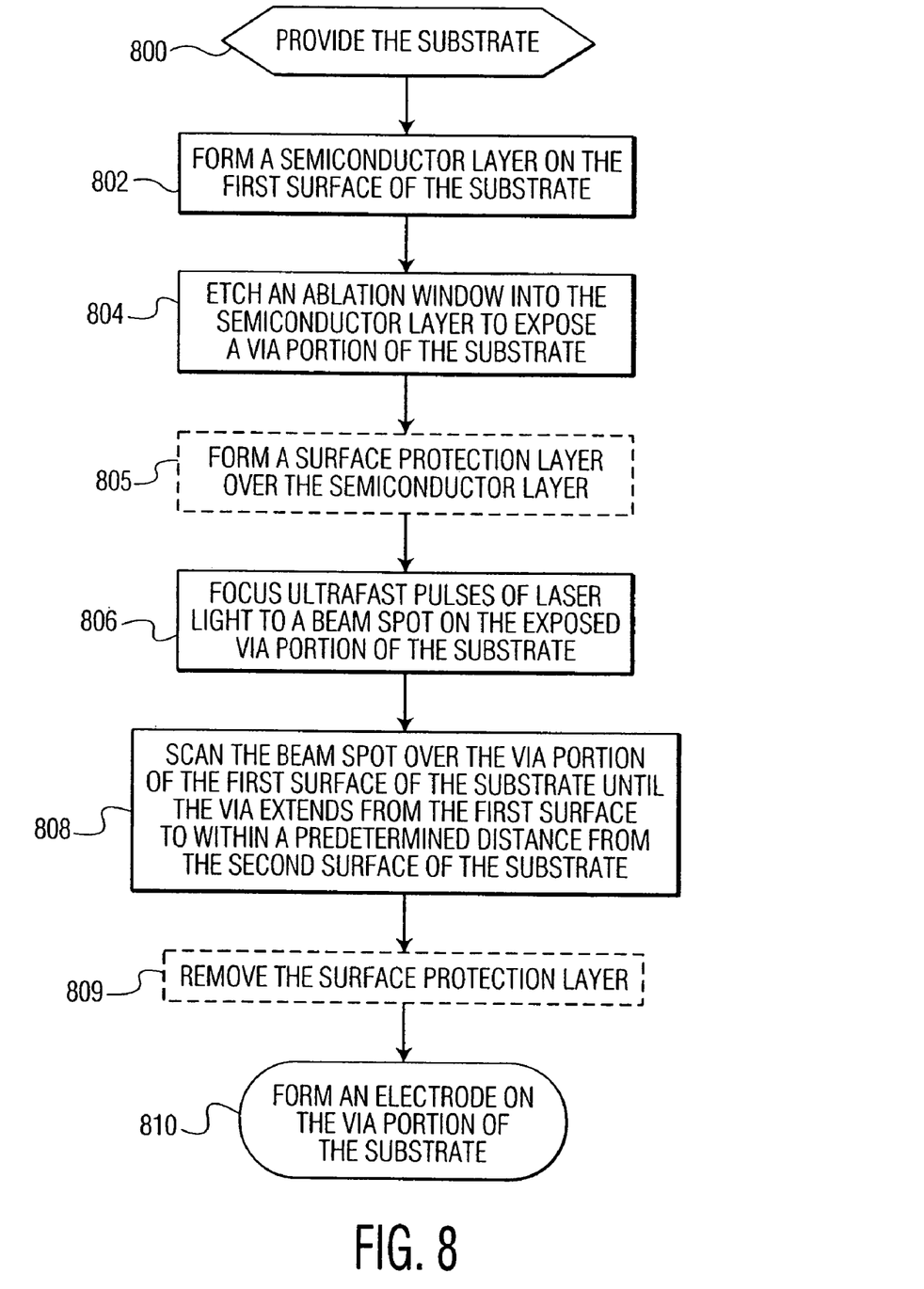
FIG. 8 is a flow chart illustrating an alternative exemplary process for forming a microwave monolithic integrated circuit, according to the present invention.

FIG. 6A-E illustrate an alternative exemplary microwave monolithic integrated circuit (MMIC) according to the present invention, during different stages of manufacture according to the exemplary method of FIG. 8.

FIG. 8 is a flow chart illustrating an exemplary method for forming a semiconductor device on a substrate. The substrate, which includes an electrically insulating material having a first surface and a second surface, is provided, step 800. The electrically insulating material may desirably be a mechanically and chemically resistant material that is difficult to machine using typical mechanical and chemical semiconductor processing techniques, such as sapphire or SiC.

Figure 6A:
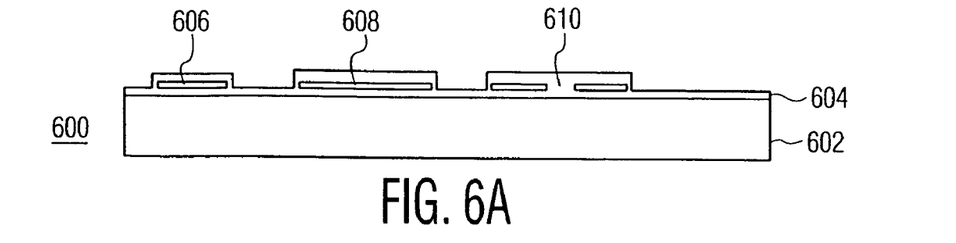
FIGS. 6A, 6B, 6C, 6D and 6E are cross-sectional side plan drawings of an apparatus according to an alternate exemplary embodiment of the present invention during manufacture, according to another method of the present invention.

A semiconductor layer is formed on the first surface of the substrate, step 802. This semiconductor layer may desirably include a plurality of sublayers formed of semiconductors having different doping concentrations and/or material compositions. Although it is contemplated that the semiconductor layer may be formed of any typical semiconductor materials, one exemplary semiconductor material of interest is GaN. FIG. 6A is a cross-sectional view of MMIC 600 at this step in the manufacturing process. MMIC 600 includes electrically insulating substrate 602 and semiconductor layer 604 formed on a first surface of substrate 602. Semiconductor layer 604, as shown, includes a plurality of microwave circuit elements, including resistor 606, capacitor 608, and inductor 610. Those skilled in the art may recognize that semiconductor layer 604 may also contain any number of additional microwave circuit elements, such as transistors, couplers, transmission lines, mixers, and antennas, for example. It is noted that, although MMIC 600 in FIG. 6A-E is shown with the microwave circuit elements being formed as part of the formation of semiconductor layer 604 in step 802, these microwave circuit elements may be formed after formation of the via instead.

Ablation window 612 is etched into semiconductor layer 604, step 804, thereby exposing a via portion of substrate 602.

Figure 6B:
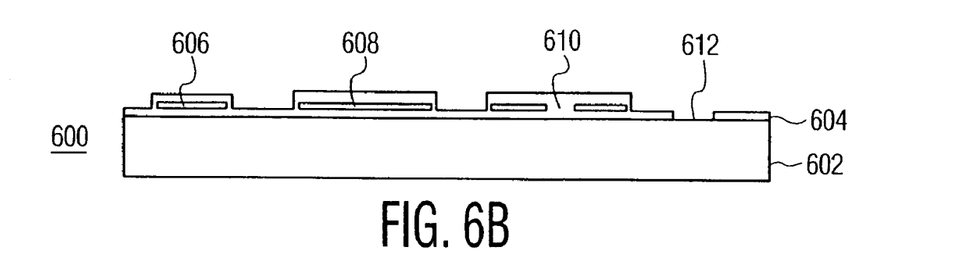

FIG. 6B shows MMIC 600 at this stage of the manufacturing process. In an exemplary embodiment, ablation window 612 may be formed by chemically etching semiconductor layer 604 over the via portion of substrate 602.

Optionally, a surface protection layer, as described above (not shown in FIG. 6), may be formed over semiconductor layer 604, step 805 (shown in phantom), thereby protecting semiconductor layer 604 and devices disposed thereon from ablation debris. In an exemplary embodiment, the surface protection layer may be formed prior to step 804, whereby step 804 includes etching an ablation window into the surface protection layer as well as etching semiconductor layer 604.

For relatively thick substrates (e.g., 400 μm), it may be undesirable to laser machine a via extending the entire thickness of the substrate. Accordingly, in this exemplary embodiment of the invention, once ablation window 612 is formed, in step 804, one or more of the exemplary laser ablation methods described above may be used to ablate a via extending from the first surface of substrate 602 to a predetermined depth. Pulses of laser light of an ultrafast pulsed laser source are substantially focused to a beam spot on the exposed via portion of substrate 602 such that each focused pulse of laser light ablates a volume of the substrate, step 806. The beam spot of the focused pulses of laser light is scanned over the via portion of the first surface of substrate 602, step 808. This scanning continues until the via is substantially formed and extends from the first surface of substrate 602 to a within predetermined distance from the second surface of the substrate.

Figure 6C:
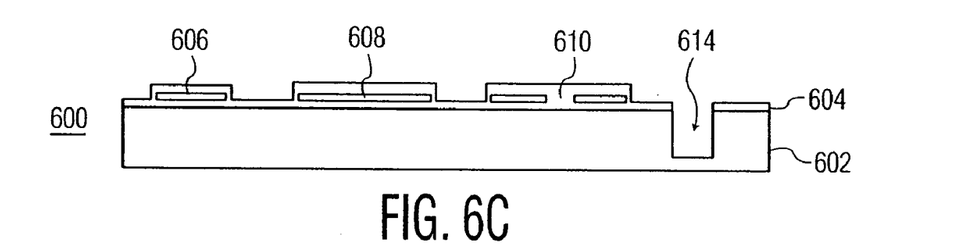
Figure 6D:
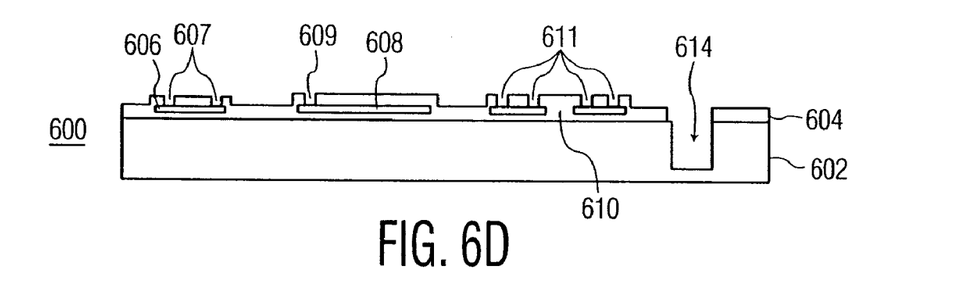

FIG. 6C shows exemplary MMIC 600 at this step in the manufacturing process, where via 614 extends from the first surface of substrate 602 to within a predetermined distance from the second surface. It is noted that one or more contact windows may be formed in the semiconductor layer after step 806, or during step 802, to expose contact portions of one or more circuit elements. FIG. 6D shows MMIC 600 after resistor contact windows 607, capacitor contact window 609, and inductor contact windows 611 have been formed in semiconductor layer 604.

If a surface protection layer was formed in step 805, it may be removed, as described above, at this point, step 809 (shown in phantom), to expose the surface of semiconductor layer 604 for further processing.

Figure 6E:
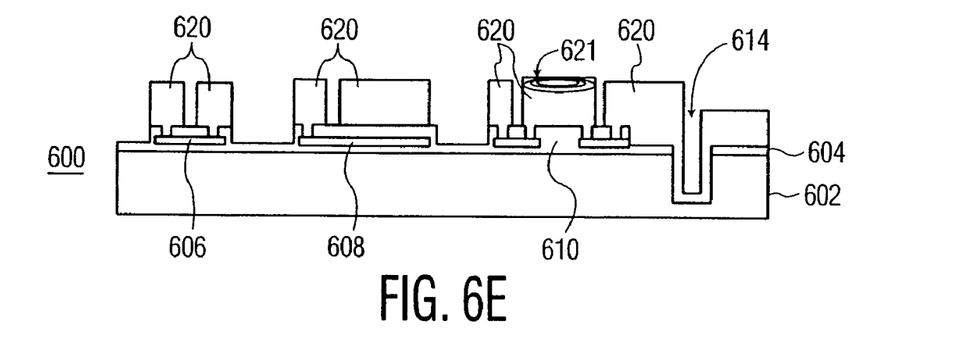

Electrode structure 620 is then formed on at least the via portion of substrate 602, step 810. If contact windows have been formed in the semiconductor layer to expose contact portions of one or more circuit elements electrode structure 620 may desirably extend over these contact portions as well. Additionally, electrode structure 620 may include multiple electrodes. FIG. 6E shows exemplary MMIC 600 after electrode structure 620 has been formed over contact windows 607, 609, 611, and via 614.

Once electrode structure 620 is formed, providing electrical connections according to a predetermined circuit design, the second surface of substrate 602 may be thinned to expose the portion of electrode structure 620 that extends through via 614. Substrate 602 may be wafer thinned by mechanical or chemical methods known in the art. Once the second surface of substrate 602 is thinned by the predetermined distance, described above, a metallization layer may be formed on the second surface, wherein the metallization layer is electrically coupled to the exposed electrode. In an alternate exemplary embodiment, substrate 602 may be thinned before electrode structure 620 has been formed.

Additionally, after thinning, a heat sink may be formed on the second surface of substrate 602. The heat sink may be thermally coupled to the exposed portion of electrode structure 620 to provide for efficient thermal management of exemplary MMIC 600.

Figure 7:
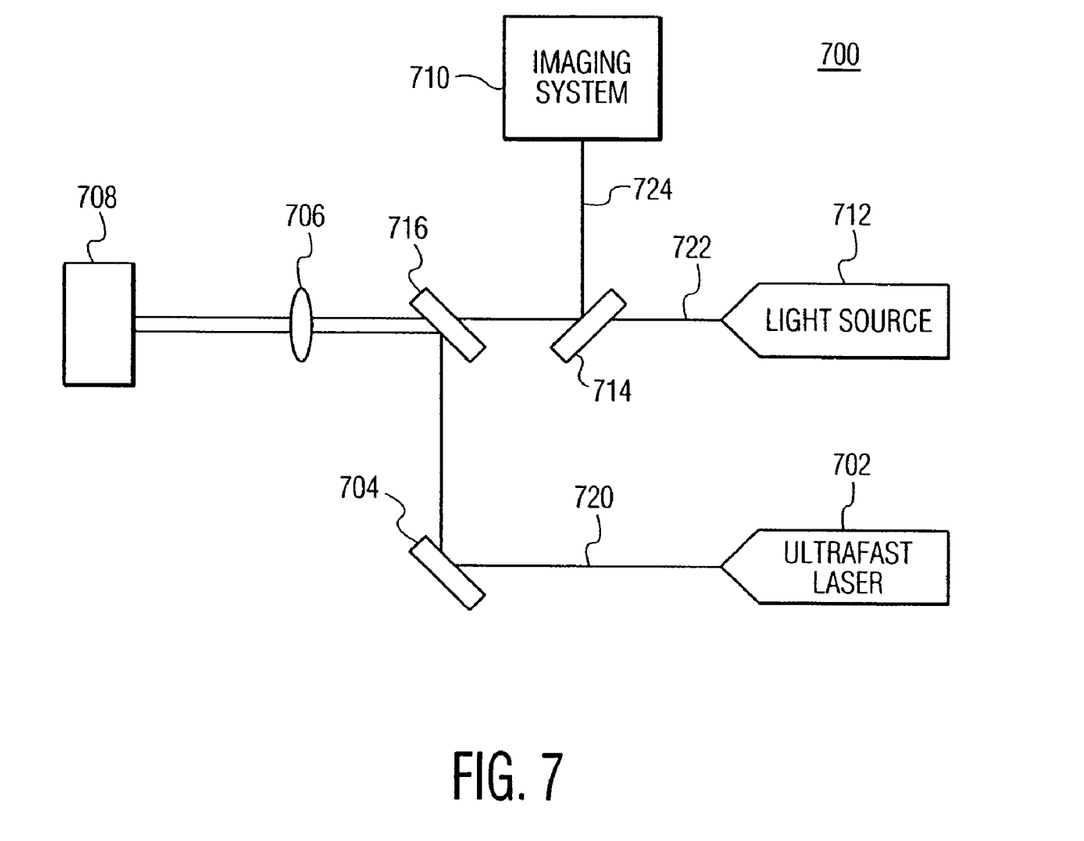
FIG. 7 is a block diagram of an exemplary laser machining system for machining a substrate via, according to the present invention.

FIG. 7 is a block diagram of an exemplary laser machining system for single via hole machining, according to one exemplary embodiment of the present invention The system 700 includes ultrafast laser 702, which generates laser beam 720. The laser source used to produce laser beam 720 may be any ultrafast short-pulse laser, such as a femtosecond laser or a picosecond laser. This laser source may desirably include any type of solid state gain medium typically used for laser machining applications, such as: Cr:YAG (peak fundamental wavelength, $\lambda_f$=1520 nm); Cr:Forsterite ($\lambda_f$=1230-1270 nm); Nd:YAG and Nd:YVO4 ($\lambda_f$=1064 nm); Nd:GdVO4 ($\lambda_f$=1063 nm); Nd:YLF ($\lambda_f$=1047 nm and 1053 nm); Nd:glass ($\lambda_f$=1047-1087 nm); Yb:YAG ($\lambda_f$=1030 nm); Cr:LiSAF ($\lambda_f$=826-876 nm); Ti:Sapphire ($\lambda_f$=760-820 nm); and Pr:YLF ($\lambda_f$=612 nm). These solid state gain media may be pumped using standard optical pumping systems such as flash lamp, erbium doped fiber lasers, and diode lasers, the output pulses of which may be directly coupled into the solid state gain medium or may undergo harmonic generation before being used to pump the solid state gain medium. The solid state gain medium (media) may be configured to operate as one or more of: a laser oscillator; a single pass amplifier; and/or a multiple pass amplifier. This element also includes optics to substantially collimate the laser light.

The laser source may desirably produce nearly Fourier-transform limited pulses. An ultrafast laser source may be desired, where these pulses may have a duration of less than about 1 ns, and typically less than 50 ps. The use of an ultrafast short-pulse laser for the ablation process desirably avoids thermal deformations of a workpiece, and serves to remove material from the workpiece by stripping the electrons of the irradiated atoms, essentially vaporizing the material with nanometer to sub-nanometer precision. Alternatively, the laser source may include an excimer laser system (e.g. XeCl, $\lambda_f$=308 nm; KrF, $\lambda_f$=248 nm; ArF, $\lambda_f$=193 nm; or $F_2$, $\lambda_f$=157 nm), a dye laser system (e.g. 7-diethylamino-4-methylcoumarin, $\lambda_f$=435-500 nm; benzoic acid, 2-[6-(ethylamino)-3-(ethylimino)-2,7-dimethyl-3H-xanthen-9-yl]-ethyl ester, monohydrochloride, $\lambda_f$=555-625 nm; 4-dicyanmethylene-2-methyl-6-(p-dimethylaminostyryl)-4H-pyran, $\lambda_f$=598-710 nm; or 2-(6-(4-dimethylaminophenyl)-2,4-neopentylene-1,3,5-hexatrienyl)-3-methylbenzothiazolium perchlorate, $\lambda_f$=785-900 nm), or other laser system used in laser machining applications.

Laser beam 720 travels along an optical path until it is incident upon first mirror 704. First mirror 704 may be a conventional laser mirror having a high reflectivity at the wavelength of laser beam 720. In an alternate exemplary embodiment, first mirror 704 may be a PZT scan mirror that performs beam homogenization. It may also move as needed to guide laser beam 720 onto second and third mirrors 714 and 716, respectively, thereby moving a beam spot of laser beam 720 on substrate 708 so as to scan the beam spot. In an exemplary embodiment, first mirror 704 may be a conventional PZT scan mirror that is highly reflective at the wavelength of laser beam 720.

Laser beam 720 is, thus, reflected from first mirror 704 and propagates along the optical path until it is incident upon second mirror 716 which, in turn, reflects the beam to be coupled into optical lens 706. In an exemplary embodiment, second mirror 716 may be a conventional laser mirror having a high reflectivity at least at the wavelength of laser beam 720. In an alternate exemplary embodiment, second mirror 716 is a dichroic mirror that transmits at least a portion of the light emitted by light source 712 and substantially reflects the wavelength of laser beam 720.

Optical lens 706 is selected to desirably focus laser beam 720 onto a surface of substrate 708. In an exemplary embodiment, optical lens 706 may be a conventional magnifying lens used in laser systems with a relatively short focal length. For example, optical lens 706 may be a 2× lens with a numerical aperture of 0.065.

Substrate 708 may be mounted on a translation stage (not shown in FIG. 7). In an exemplary embodiment, the translation stage may include a mechanical translation stage, such as a Burleigh Inchworm system, for moving substrate 708 in a direction toward optical lens 706. In an alternate exemplary embodiment, the translation stage may move only in one dimension (i.e. in either the X, Y, or Z dimension) or in all three dimensions. In yet another alternate exemplary embodiment, a translation stage having six degrees of freedom may be provided, wherein the translation stage provides x-, y-, and z-stages, which may include brushless, coreless linear motor stages for moving substrate 708, held by a rotary-shift, to a desired location with respect to laser beam 720. Accordingly, laser beam 720 may be aligned at an arbitrary $\phi$ angle in the cylindrical coordinate system having z as its radial axis. In one exemplary embodiment, $\phi$ may be set to any angle between nearly +90° and −90°. In another exemplary embodiment, $\phi$ may be dynamically altered throughout the ablation process so as to maintain a desirable alignment between laser beam 720 and the surface of substrate 708. In a further exemplary embodiment of the invention including a translation stage, therefore, scanning laser beam 720 on substrate 708 may be achieved by movement of substrate 708, by the translation stage, with respect to laser beam 720.

In the exemplary embodiment of FIG. 7, imaging system 710 may be used to align laser beam 720 with the target area of substrate 708. Imaging system 710 may be used to ensure that laser beam 720 is incident upon substrate 708 at the correct location as well as to monitor progress of the machining process. In an exemplary embodiment, imaging system 710 may include a charge-coupled device (CCD) array or other digital or analog camera. Imaging system 710 may include a display mechanism (not shown), allowing a system operator to monitor where laser beam 720 is incident upon substrate 708. Alternatively, image data provided by the imaging system may be received by a controller (not shown in FIG. 7) and processed to implement desired control functions. In an exemplary embodiment, the controller may be a conventional computing means, such as a personal computer with a monitor (not shown) that may be used to display an image of the work piece generated by imaging system 710.

Imaging system 710 may be used in conjunction with light source 712 and other parts of laser drilling system 700. In an exemplary embodiment, light source 712 is a conventional incandescent light source capable of producing a well-focused spot of light. In the exemplary system, light from light source 712 and light from laser 702 need not be transmitted simultaneously through laser drilling system 700. Before light source 712 is activated, a shutter (not shown) may be closed to prevent laser beam 720 from being transmitted through the system. Alternately, laser 702 may be selectively turned off during operation of light source 712 and imaging system 710.

In an exemplary embodiment, light source 712 may be a fiber guided light source which produces a spot of light 722 with a 2 cm diameter. The spot of light 722 generated by light source 712 travels along an optical path, through beam splitter 714. In an exemplary embodiment, beam splitter 714 may be a partially reflecting mirror or a substantially transparent substrate, such as glass. The spot of light 722 continues to propagate along the optical path until it is incident upon second mirror 716 and optical lens 706, where it is incident upon substrate 708. A portion of spot of light 722 reflects from the surface of substrate 708, as image signal 724, back along the optical path, through optical lens 706, through second mirror 716, until it is incident upon beam splitter 714. Beam splitter 714 reflects image signal 724 so that it is incident upon imaging system 710 to produce an image of the surface of substrate 708.

In the absence of a stream across the substrate surface during ablation, small particles of ablated substrate material may settle on and bond to the substrate surface, thereby producing an undesirable undulations thereon. Accordingly, in a further exemplary embodiment of the present invention, laser machining system 700 may include a fan or air knife (not shown in FIG. 7) for blowing a gas across the substrate surface during ablation, thereby directing material debris away from the ablation region.

In one exemplary embodiment, a 140 mm by 140 mm square via may be formed by a rectangular raster scan pattern ablation path, similar to the one shown in FIG. 2A, consisting of 400 horizontal scan lines having 400 equally spaced points of ablation along each scan line. The laser is pulsed as it is scanned along the scan pattern, as described, thereby ablating the surface of the substrate material by a certain depth. This process may then be repeated for a predetermined number of layers and/or until a feature such as a via is formed having a desired depth. In an exemplary embodiment of the invention, ultrafast laser 102 may operate at a wavelength of 385 nm and generate 15 mW femtosecond pulses.

Those skilled in the art will recognize that a plurality of additional laser machining system components may be included to provide desirable machining features, without departing from the scope of the present invention. Such additional components may include, but are not limited to, a laser shutter system for controlling the propagation of the laser beam, an attenuator for filtering the energy in the laser beam, a mask or hologram system to provide multiple laser beam images for machining multiple holes, a beam splitter to provide multiple laser beam images for machining multiple holes, and optics for beam shaping the laser beam.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed is:

1. A method for forming a semiconductor device on a substrate, the substrate having a via, the method comprising the steps of:

a) providing the substrate including an electrically insulating material having a first surface and a second surface;

b) forming an ablation buffer layer on at least a portion of the second surface of the substrate;

c) forming a semiconductor layer on the exposed portions of the second surface of the substrate and;

d) substantially focusing pulses of laser light of an ultrafast pulsed laser source to a beam spot on the first surface of the substrate such that each focused pulse of laser light ablates a volume of the substrate;

e) scanning the beam spot of the focused pulses of laser light over a via portion of the first surface of the substrate until the via is formed extending from the first surface of the substrate to the ablation buffer layer, thereby exposing a portion of the ablation buffer layer;

f) etching the exposed portion of the ablation buffer layer to expose a contact portion of the semiconductor layer; and g) forming an electrode on the first surface of the substrate such that the electrode is electrically coupled through the via to the contact portion of the semiconductor layer.

2. A method according to claim 1, step (e) further includes moving the substrate in a direction substantially normal to the first surface of the substrate to control the volume of the substrate ablated by each pulse of laser light to be substantially constant.

3. A method according to claim 2, wherein the substrate is moved in the direction substantially normal to the first surface of the substrate in steps less than a thickness of the ablation buffer layer.

4. A method according to claim 1, step (e) further includes moving the beam spot in a direction substantially normal to the first surface of the substrate to control the volume of the substrate ablated by each pulse of laser light to be substantially constant.

5. A method according to claim 4, wherein the beam spot is moved by substantially refocusing the pulses of laser light of the ultrafast pulsed laser source.

6. A method according to claim 1, further comprising the step of:
h) selectively blowing a stream across at least the via portion of the first surface of the substrate to redirect debris from the via portion.

7. A method according to claim 1, wherein step (e) includes moving the substrate in one or more of a tilt angle, a rotational angle, or a radial direction coplanar to the first surface of the substrate.

8. A method according to claim 1, further comprising the step of:
h) obtaining imaging data of at least the via portion of the first surface of the substrate with an imaging system.

9. A method according to claim 8, further comprising the step of:
i) controlling one or more of step (d) or step (e) according to the imaging data.

10. A method according to claim 1, wherein:
step (a) further includes forming a surface protection layer on the first surface of the substrate; and
step (c) includes substantially focusing the pulses of laser light of the ultrafast pulsed laser source to the beam spot on the surface protection layer to ablate the via portion of the surface protection layer prior to ablating the substrate.

11. A method according to claim 10, further comprising the step of:
h) dissolving the soluble surface protection layer after step (e).

12. A method according to claim 1, wherein:
the via portion has a rectangular cross-section; and
step (e) includes scanning the beam spot in a raster scan pattern.

13. A method according to claim 1, wherein:
the via portion has a round cross-section; and
step (e) includes scanning the beam spot in a spiral scan.

14. A method according to claim 1, wherein step (b) includes forming one of a silicon dioxide layer or an amorphous diamond layer on the second surface of the substrate.

15. A method according to claim 1, wherein step (g) includes forming a heat sink on the first surface of the substrate such that the heat sink is thermally coupled through the via to at least one of:
the contact portion of the semiconductor layer; or
a side wall portion of the ablation buffer layer.

16. A method according to claim 1, wherein step (g) includes forming a ground plane on the first surface of the substrate such that the ground plane is electrically coupled through the via to at least one of:
the contact portion of the semiconductor layer; or
a side wall portion of the ablation buffer layer.

17. A method for forming a semiconductor device on a substrate, the method comprising the steps of:
a) providing the substrate including an electrically insulating material having a first surface and a second surface;
b) forming a semiconductor layer on the first surface of the substrate;
c) etching an ablation window into the semiconductor layer, thereby exposing a via portion of the substrate;
d) substantially focusing pulses of laser light of an ultrafast pulsed laser source to a beam spot on the exposed via portion of the substrate such that each focused pulse of laser light ablates a volume of the substrate;
e) scanning the beam spot of the focused pulses of laser light over the via portion of the first surface of the substrate until the via is substantially formed extending from the first surface of the substrate to within a predetermined distance from the second surface of the substrate;
f) forming an electrode structure on at least the via portion of the substrate.

18. A method according to claim 17, further comprising the steps of:
forming a surface protection layer over the semiconductor layer and any exposed portions of the substrate prior to step (d); and
removing the surface protection layer after step (e).

19. A method according to claim 17, further comprising the step of:
g) etching one or more contact windows in the semiconductor layer to expose contact portions of one or more circuit elements;
wherein step (f) further includes forming the electrode structure over the contact portions of the one or more circuit elements.

20. A method according to claim 17, further comprising the step of:
g) thinning the second surface of the substrate by the predetermined distance, thereby exposing a portion of the electrode.

21. A method according to claim 20, further comprising the step of:
h) forming a metallization layer on the second surface of the substrate, the metallization layer being electrically coupled to the electrode.

22. A method according to claim 20, further comprising the step of:
h) forming a heat sink on the second surface of the substrate, the heat sink being thermally coupled to the electrode.

23. A method according to claim 17, wherein step (e) further includes moving one or more of the substrate and the beam spot in a direction substantially normal to the first surface of the substrate to control the volume of the substrate ablated by each pulse of laser light to be substantially constant.

24. A method according to claim 17, further comprising the step of:
g) selectively blowing a stream across at least the via portion of the first surface of the substrate to redirect ablation debris from the via portion.

25. A method according to claim 17, wherein step (e) includes moving the substrate in one or more of a tilt angle, a rotational angle, or a radial direction coplanar to the first surface of the substrate.

26. A method according to claim 17, further comprising the step of:

g) obtaining imaging data of at least the via portion of the first surface of the substrate with an imaging system.

27. A method according to claim 26, further comprising the step of:

h) controlling one or more of step (b) or step (f) according to the imaging data.

28. A method according to claim 17, wherein:

the via portion has a rectangular cross-section; and step (e) includes scanning the beam spot in a raster scan pattern.

29. A method according to claim 17, wherein:

the via portion has a round cross-section; and step (e) includes scanning the beam spot in a spiral scan.

* * * * *